B. SAGEN.
AGRICULTURAL IMPLEMENT.
APPLICATION FILED DEC. 28, 1916.
1,227,938.
Patented May 29, 1917.
2 SHEETS—SHEET 2.
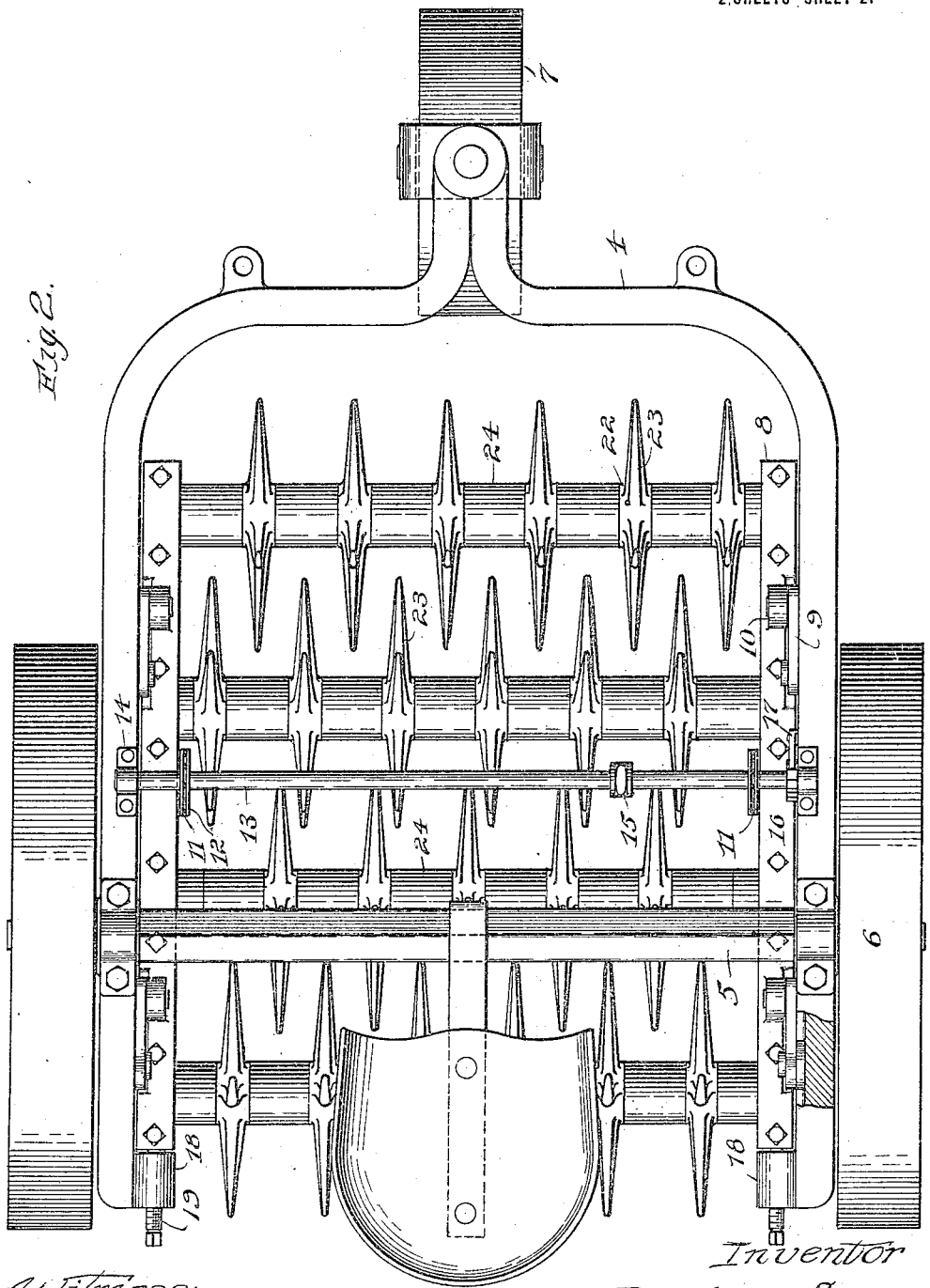

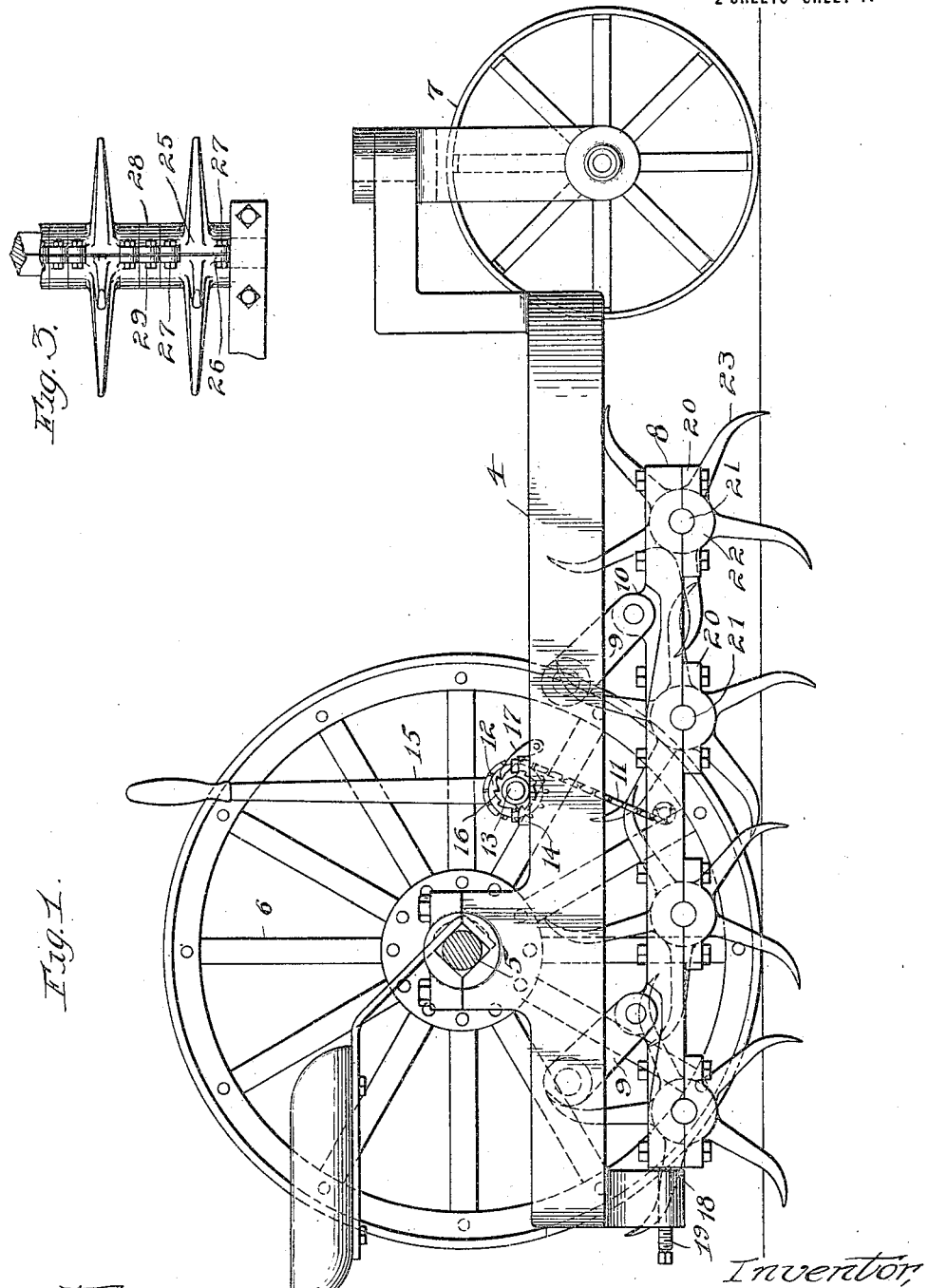

UNITED STATES PATENT OFFICE.

BERNHARD SAGEN, OF CHICAGO, ILLINOIS.

AGRICULTURAL IMPLEMENT.

1,227,938.

Specification of Letters Patent.   Patented May 29, 1917.

Application filed December 28, 1916. Serial No. 139,275.

*To all whom it may concern:*

Be it known that I, BERNHARD SAGEN, a citizen of the United States, residing at Chicago, in the county of Cook and State of Illinois, have invented certain new and useful Improvements in Agricultural Implements, of which the following is a specification.

This invention relates more particularly to a rotary cultivating and pulverizing apparatus which is adapted for plowing or working land and pulverizing the same, and also for cultivating corn or other crops.

The objects of this invention are to provide an improved cultivator or apparatus of the character set forth; to provide means for digging up soil, turf, weeds or the like, and pulverizing the same; to provide a machine of this character which will be easy to operate, and to provide the same with convenient means for adjusting the depths of the cutting or working devices, and means for raising the same out of operative position; and to provide such other advantages as will appear more fully from the following specification.

In the accompanying drawings illustrating this invention:

Figure 1 is a side view, showing one wheel removed;

Fig. 2 is a plan view;

Fig. 3 is a detail.

As shown in these drawings, 4 represents the main frame, which is supported on a rear axle 5 and wheels 6. The front of the frame is supported by means of a steering wheel 7, but it is apparent that two wheels may be used at the front if desired. A frame 8 for the rotary digging or harrowing devices is carried by links 9, 9, which are pivoted to lugs 10 on the frame 8 and to the sides of the main frame 4. The sides of the frame 8 are connected by chains 11 with drums 12 on a shaft 13, mounted in bearings 14 on the frame 4. A hand lever 15 is secured to the shaft 13 for turning the same to turn the drums and wind up the chains, and raise the frame to elevate the cultivating devices out of operative position. A ratchet wheel 16 and pawl 17 or any other suitable devices may be provided for holding the shaft 13 in adjusted position. In order to adjust the position of the frame 8 to regulate the depth to which the cultivators will enter the ground, I provide lugs 18 at the rear of the main frame 4, which are tapped for the set screws 19. The inner ends of these screws engage with the rear end of the sides of the frame 8, and, as these screws are turned to move them forwardly, they press against the end of the frame 8 and swing the frame up to any position desired. This provides for a very simple and accurate adjustment, and makes a very rigid construction, as the pulling strains are all transmitted through the substantial frame members.

The frame 8 has a number of bearings 20 in each side for the transverse shafts 21, which carry the harrowing or cultivating members. These shafts are preferably rectangular in cross section, with the ends turned for engagement with the bearings. The harrowing or cultivating members comprise hubs 22 with radial arms 23, which are preferably curved as shown, and sharpened at their ends. These cultivating devices are preferably cast, and the hubs may be made solid as shown in Fig. 2, and slipped over the ends of the shafts. Sleeves or spreaders 24 are provided for holding the cultivating devices in adjusted position longitudinally of their shafts. For ordinary harrowing these devices are preferably arranged at regular intervals, as shown in Fig. 2, and the teeth of the forward devices extend back between the teeth of the next set to the rear. When the machine is to be used for cultivating, as for cultivating corn, it may be desirable to straddle a row, and in this instance the positions of the rotary cultivating devices will be changed so as to leave a clear space longitudinally of the machine. This may be done by omitting some of the devices or inserting different length spreaders. In order to facilitate the adjustment of these devices, and also their ready attachment and removal, they may be formed as shown in Fig. 3, with the hubs 25 split and provided with lugs 26 for the bolts 27, whereby the two sides of the hub may be clamped together on the shaft. The collars 28 are also split and provided with bolts 29 to fasten the two parts together, and these collars may be made comparatively short so that adjustments may be readily made by inserting more or less collars, or removing the collars between two hubs and inserting them between two other hubs.

The machine may be drawn by any suitable power, and when the harrowing or cultivating devices are adjusted so that the arms or digging members 23 dig into the turf or soil the devices will all rotate and the arms will lift up portions of soil or turf. If the soil or turf tends to hang together, as is apt to occur when digging sod or weeds, the portions carried up by the upwardly moving arms of the first member are met by the downwardly moving arms of the second member, which causes a thorough pulverizing or tearing apart of the turf, and this action is of course repeated until the last member is reached. All of the harrowing or cultivating devices may be raised out of the ground by pulling back on the lever 15, which winds up the chains 11 and raises the frame 8 to elevated position. The depth of the cutting may of course be adjusted by means of screws 19, as heretofore described.

Having thus described my invention, which I do not wish to limit to the exact arrangement or details of construction herein shown and described, except as specified in the following claims, what I claim as my invention is:

1. In a machine of the character set forth, the combination of a main frame, links pivoted to the main frame, an auxiliary frame pivoted to the lower ends of said links, threaded lugs at the rear end of the main frame, and screws in said lugs for engagement with the end of the auxiliary frame, to adjust the same with respect to the main frame.

2. In a machine of the character set forth, the combination of a main frame, a rear axle and wheels for supporting said frame, a front steering wheel for said frame, an auxiliary frame, links connecting the auxiliary frame with the main frame, manually operable means for lifting said auxiliary frame, lugs at the rear of said main frame, screws passing through said lugs and engaging with the rear end of the auxiliary frame, a plurality of transverse shafts carried by said auxiliary frame, and a plurality of rotary harrowing devices carried by each of said shafts.

BERNHARD SAGEN.

Copies of this patent may be obtained for five cents each, by addressing the "Commissioner of Patents, Washington, D. C."